(No Model.)
W. HEMPEL.
THERMOMETER FOR CULINARY PURPOSES.
No. 339,176. Patented Apr. 6, 1886.
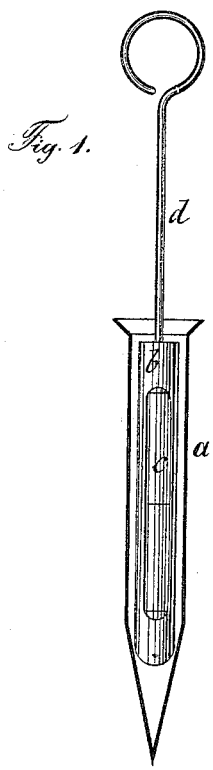
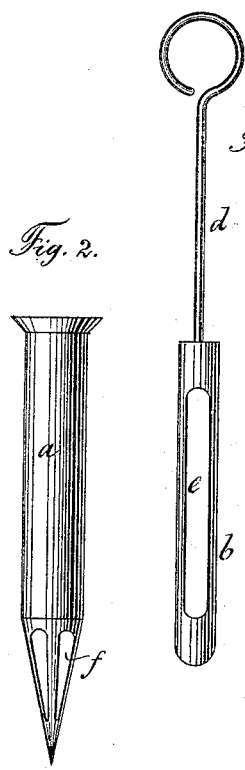
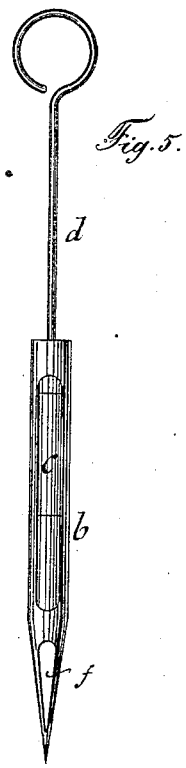
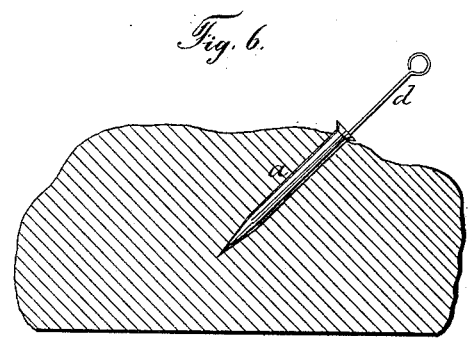
Witnesses.
Anthony Steffen
Jean Hassert
Inventor.
Walther Hempel
By his Attorneys
Brydges & Co

United States Patent Office.

WALTHER HEMPEL, OF DRESDEN, SAXONY, GERMANY.

THERMOMETER FOR CULINARY PURPOSES.

SPECIFICATION forming part of Letters Patent No. 339,176, dated April 6, 1886.

Application filed March 27, 1885. Serial No. 160,384. (No model.)

*To all whom it may concern:*

Be it known that I, WALTHER HEMPEL, of the city of Dresden, in the Kingdom of Saxony and German Empire, have invented certain new and useful Improvements in Thermometers for Culinary Purposes, of which the following is a specification.

My invention relates to improvements in thermometers for culinary purposes, by means of which said thermometers it is rendered possible to ascertain when meat or meats is or are properly roasted, baked, or cooked.

My improved thermometer for culinary purposes consists of an exterior case or shell, an interior perforated tubular shell, and the capsule for the fusible matter. The former is pointed at its forward end, in order to admit the ready insertion of the same into the matter to be roasted, baked, or cooked, and serves to receive the thermometer shell or cover, which can be provided with a suitable handle.

The thermometer proper consists, preferably, of a perforated tubular or other appropriate shell with handle, and contains the elongated glass capsule with its two kinds or qualities of fusible matter, the melting-points of which are respectively about 60° centigrade (140° Fahrenheit) and 70° to 74°, (159° to 166° Fahrenheit.)

Figure 1 represents my improved thermometer for culinary purposes, with the outer case or shell, *a*, in section, the inner perforated tube and the capsule with fusible matter in elevation. Fig. 2 represents the outer case or shell, *a*, with perforated inferior end. Fig. 3 is an elevation of the inner perforated tubular shell or protective covering, *b*, for the glass capsule, said capsule being provided with fusible matter. Fig. 4 is an elevation of the glass capsule *c*, which is filled, preferably, with two materials of varying melting-points. Fig. 5 represents the inner shell or cover, *b*, with perforated pointed inferior end. Fig. 6 represents the application of my improved culinary thermometer for ascertaining the temperature of a piece of meat.

*a* is the outer shell or case with pointed tip or inferior end. *b* is the inner or interior case or shell with rounded or pointed tip or lower end. *c* is the glass capsule containing the fusible matter. *d* is the handle to the case or shell *b*. *e* represents the perforation of the same, and *f* the perforation of the tip or inferior end of the shells or cases *a* and *b*.

The outer case or shell, *a*, which can be perforated or not, as may be desired, is inserted in the meat by means of its pointed inferior end, and the inner case or protective covering, *b*, containing the glass capsule *c*, with the fusible matter, introduced into the same by means of the handle *d*.

If found desirable, the lower end of the outer case or shell, *a*, or the outer and inner cases or shells, *a* and *b*, can be perforated, as represented in Figs. 2 and 5, in order to allow the juice of the meat to penetrate direct to the glass capsule *c*, containing the fusible matter.

The elongated perforations *e* of the case *b* serve to facilitate the observation of the condition of the fusible matter in the glass capsule *c*, and, if preferred, the said case or shell *b* with the capsule *c* can be employed alone and without the outer shell or case, *a*, in which case the same must be pointed at its lower end, as shown in Fig. 5.

In order to apply my said improved thermometer for culinary purposes for ascertaining when meat or such like is properly roasted, baked, or cooked, I introduce or force the outer shell or case, *a*, into the meat and insert the inner case, *b*, which is provided with the handle *d* and contains the capsule *c*, with the fusible matter or material, into the said case or shell *a*, so that the thermometer proper can at any time be readily withdrawn from the case or shell *a*, in order to ascertain how far the roasting, baking, or cooking process is advanced.

Although I have stated that the case or shell *b* can be employed alone, thus dispensing with the outer case, *a*, I prefer to employ the latter, for the reason that the fibers of the meat might be injured by the repeated withdrawal and insertion of the thermometer when no outer case or shell is employed, and in order to retain the glass capsule *c* clear, I prefer to use closed outer cases or shells, so as to keep the said capsule perfectly clear, and thus facilitate the observation of the fusible matter contained in the same, although it is evident that perforated cases or shells can be employed to great advantage in spite of their necessitating the wiping of the surface of the glass capsule c at each observation.

As soon as the meat is underdone—*id est*, a temperature of about 60° centigrade, or 140° Fahrenheit, attained—one of the fusible matters or materials employed will be melted, and if the meat is well done both of the fusible materials employed will be melted, thus showing that a temperature of 70° to 74° centigrade, or 159° to 166° Fahrenheit, is reached.

As fusible matter or material I employ appropriate fats, waxy metallic alloys, or their equivalents.

The cases a and b can be made of silver electroplated metal, glass, or other suitable material.

I wish it to be clearly understood that I do not profess to make a general claim to the employment of fusible matter or material or alloys for indicating temperatures, as such matters have already been employed for indicating the temperature of steam in steam-boilers, in heaters, and in hot air chambers; but What I do claim as my invention, and desire to secure by Letters Patent, is—

1. In a thermometer for culinary purposes, the combination of the outer shell or case, a, with the inner or interior case or shell or protection cover, b, and with the glass capsule c, said glass capsule c being provided with a filling of appropriate fusible matter, material, or alloy, substantially as described and shown.

2. In a thermometer for culinary purposes, the combination of the glass thermometer-capsule c with the case or shell b, having a handle, d, and perforations e of the shell or case b, substantially as described and shown.

3. In a thermometer for culinary purposes, the combination of the case or shell b, said case or shell being provided with the perforations e, with the glass capsule c, and the outer shell or case, a, substantially as described and shown.

In witness whereof I have hereunto signed my name in the presence of two subscribing witnesses.

WALTHER HEMPEL.

Witnesses:
OTTO WOLFF,
RICHARD BERNDT,
*Both of Dresden.*